(12) United States Patent
Sestok, IV et al.

(10) Patent No.: US 9,998,169 B2
(45) Date of Patent: *Jun. 12, 2018

(54) PHASE ROTATOR FOR COMPENSATING TRANSCEIVER IMPAIRMENTS

(71) Applicant: TEXAS INSTRUMENTS INCORPORATED, Dallas, TX (US)

(72) Inventors: Charles Kasimer Sestok, IV, Dallas, TX (US); Hunsoo Choo, Plano, TX (US); Nikolaus Klemmer, Dallas, TX (US); Xiaoxi Zhang, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/466,418

(22) Filed: Mar. 22, 2017

(65) Prior Publication Data

US 2017/0195002 A1 Jul. 6, 2017

Related U.S. Application Data

(63) Continuation of application No. 14/814,197, filed on Jul. 30, 2015, now Pat. No. 9,641,317.

(Continued)

(51) Int. Cl.
*H04B 1/38* (2015.01)
*H04B 1/403* (2015.01)
(Continued)

(52) U.S. Cl.
CPC .......... *H04B 1/406* (2013.01); *H04L 7/0331* (2013.01)

(58) Field of Classification Search
CPC .............................. H04B 1/406; H04L 7/0331
(Continued)

(56) References Cited

U.S. PATENT DOCUMENTS 5,128,966 A 7/1992 Bang
9,641,317 B2 * 5/2017 Sestok, IV ........... H04B 1/1027
(Continued)

OTHER PUBLICATIONS

Prithvi Shylendra, "Design of a CMOS VCO and Frequency Divider for 5GHz Applications", May 2006, Figure 1.5 (a) pp. 9-10.
(Continued)

*Primary Examiner* — Ayodeji Ayotunde
(74) *Attorney, Agent, or Firm* — John R. Pessetto; Charles A. Brill; Frank D. Cimino (57) ABSTRACT

A phase rotator corrects the IQ imbalance in a wireless transceiver. The phase rotator is a part of a compensation system that detects and separates reception impairment images from transmission impairment images. The disclosed phase rotator introduces a phase shift between the transmission channel and the reception channel without perturbing the phase mismatch and the gain mismatch in the reception path. The phase rotator includes a first local oscillation (LO) circuit that generates a first LO signal at a first carrier frequency and a second LO circuit that generates a second LO signal at a second carrier frequency that deviates from the first carrier frequency for a phase rotation period. The phase rotation period is sufficiently long such that the frequency deviation can introduce a prescribed phase shift between the first LO signal and the second LO signal.

20 Claims, 5 Drawing Sheets

Related U.S. Application Data

(60) Provisional application No. 62/032,253, filed on Aug. 1, 2014.

(51) Int. Cl.
*H04L 7/033* (2006.01)
*H04B 1/40* (2015.01)

(58) Field of Classification Search
USPC .................................................. 455/73, 77
See application file for complete search history.

(56) References Cited

U.S. PATENT DOCUMENTS

| | | |
|---|---|---|
| 2011/0195670 A1 | 8/2011 | Dakshinamurthy et al. |
| 2014/0155006 A1 | 6/2014 | Matsuura |
| 2014/0321516 A1 | 10/2014 | Al-Qaq et al. |

OTHER PUBLICATIONS

Garth Nash, "Phase-Locked Loop Design Fundamentals", Feb. 2006, Figure 2 pp. 2-4.

\* cited by examiner

PHASE ROTATOR FOR COMPENSATING TRANSCEIVER IMPAIRMENTS

CROSS REFERENCE TO RELATED APPLICATIONS

Under 35 U.S.C. §§ 119(e), 120, this continuation application claims benefits of and priority to U.S. patent application Ser. No. 14/814,197, filed on Jul. 30, 2015, which claims the benefit of priority of U.S. Provisional Application 62/032,253 filed Aug. 1, 2014. The above referenced applications are hereby incorporated herein by reference in their entirety.

BACKGROUND

A direct conversion wireless transceiver typically includes a quadrature modulator for modulating a transmission signal, and a quadrature demodulator for demodulating a reception signal. In the transmitter, the modulation process converts two independent baseband signals, the in-phase signal (a.k.a. an I-channel) and a quadrature signal (a.k.a. a Q-channel) into an RF signal that propagates on the wireless communication channel. In the conversion process, the I-channel signal is shifted to the carrier frequency of the channel by mixing with a local oscillator (LO) signal. The Q-channel signal is mixed with an LO signal that is 90-degrees out of phase from the LO signal used for the I-channel. After mixing, the two signals are combined to form the RF signal. In the receiver, the I-channel and Q-channel signals are reproduced by mixing the RF signal with two LO signals at the carrier frequency that are 90-degrees out of phase with one another. In practice however, there are impairments along the transmission path and the reception path of the wireless transceiver. These impairments disrupt the 90-degree phase separation between the in-phase signal and the quadrature LO signals, and cause mismatch between the I-channel and Q-channel amplitudes, thereby causing in-phase/quadrature (IQ) imbalance between these two signals. The IQ imbalance may result in crosstalk between the I-channel and the Q-channel, which in turns creates image interference of the transmission signal and/or the reception signal. Thus, there is a need for a compensation scheme to detect and correct the IQ imbalance in a wireless transceiver.

SUMMARY

The present disclosure describes systems and techniques relating to a compensation scheme for detecting and correcting IQ imbalance in a wireless transceiver. The disclosed compensation scheme involves a phase rotation technique for estimating and separating reception images (which are created by impairments along a reception path) from transmission images (which are created by impairments along a transmission path). Recognizing that any perturbation on the reception path may lead to an inaccurate estimation of the reception images, the disclosed phase rotation technique introduces a phase shift mechanism between the transmission channel and the reception channel without perturbing the phase mismatch and the gain mismatch in the reception path. Advantageous, the disclosed transceiver systems and techniques provide an accurate and efficient means for detecting and removing image interference created by channel impairments.

In one implementation, for example, the disclosed transceiver system includes an integrated circuit that has a first local oscillation (LO) circuit, a second LO circuit, a first mixer, and a second mixer. The first LO circuit is configured to generate a first LO signal having a first carrier frequency. Being coupled with the first LO circuit, the first mixer is configured to up-convert a baseband signal to a transmission radio frequency (RF) signal based on the first carrier frequency of the first LO signal. The second LO circuit is configured to generate a second LO signal having a second carrier frequency deviating from the first carrier frequency for a phase rotation period. The phase rotation period is sufficiently long such that the frequency deviation can introduce a prescribed phase shift between the first LO signal and the second LO signal. Being coupled with the second LO circuit, the second mixer is configured to down-convert a reception RF signal based on the second LO signal outside of the phase rotation period.

In another implementation, for example, the disclosed transceiver system includes an integrated circuit that has a first local oscillation (LO) circuit, a second LO circuit, a first mixer, a second mixer, and a switching circuit. The first LO circuit is configured to generate a first LO signal having a first carrier frequency. Being coupled with the first LO circuit, the first mixer is configured to up-convert a baseband signal to a transmission radio frequency (RF) signal based on the first carrier frequency of the first LO signal. The second LO circuit is configured to generate a second LO signal having a second carrier frequency deviating from the first carrier frequency for a phase rotation period. The phase rotation period is sufficiently long such that the frequency deviation can introduce a prescribed phase shift between the first LO signal and the second LO signal.

In yet another implementation, for example, the disclosed transceiver system includes a first local oscillation (LO) circuit, a second LO circuit, a first mixer, a second mixer, and a directional coupler. The first LO circuit is configured to generate a first LO signal having first carrier frequency. Being coupled with the first LO circuit, the first mixer is configured to up-convert a baseband signal to a transmission radio frequency (RF) signal based on the first carrier frequency of the first LO signal. The second LO circuit is configured to generate a second LO signal having a second carrier frequency deviating from the first carrier frequency for a phase rotation period. The phase rotation period is sufficiently long to implement a phase shift between the first LO signal and the second LO signal. The directional coupler is coupled with the first mixer to generate a feedback RF signal correlating with the transmission RF signal. The second mixer is coupled with the directional coupler to receive the feedback RF signal, and the second mixer is configured to down-convert the feedback RF signal based on the second LO signal outside of the phase rotation period.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus; and apparatus implementations can be realized from a disclosed system, computer-readable medium, or method. Similarly, method implementations can be realized from a disclosed system, computer-readable medium, or apparatus; and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Figure 1:
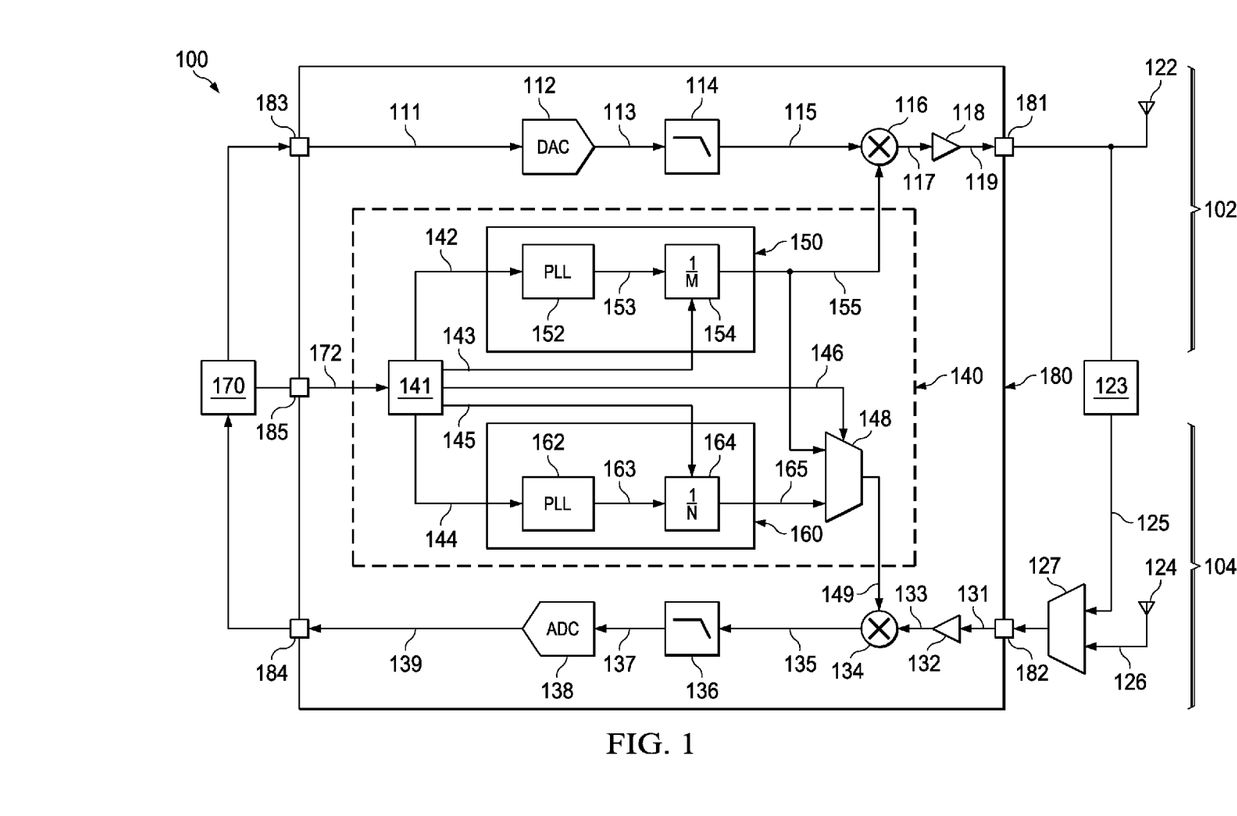
FIG. 1 shows a schematic view of a wireless transceiver system according to an aspect of the present disclosure.

FIG. 1 shows a schematic view of a front-end transceiver system (FETS) 100 according to an aspect of the present disclosure. The FETS 100 includes a transmission path (a.k.a. a front end transmitter) 102 for modulating and transmitting data generated by a back-end system, and a reception path (a.k.a. a front end receiver) 104 for receiving and demodulating a radio frequency (RF) signal to provide data to the back-end system. To integrate a portion of the transmission path 102 and the reception path 104, the FETS 100 includes a front-end transceiver integrated circuit (FETIC) 180. The FETIC 180 includes an RF transmission port 181 for connecting with a transmission antenna 122 and a RF reception port for selectively coupling between a reception antenna 124 and a feedback path including a feedback RF signal 125. The FETIC 180 also includes a data transmission port 183 and a data reception port 184 for interfacing with the back-end circuit. To detect and correct the IQ imbalance caused by the impairments in the transmission path 102 and the reception path 104, the FETS 100 includes a quadrature mismatch compensation (QMC) circuit 170, which interacts with the transmission path 102 and the reception path 104 during a compensation period.

The FETIC 180 includes a local oscillation (LO) system 140 for controlling the up-conversion operation of the transmission path 102, as well as the down-conversion operation of the reception path 104. The LO system 100 includes an LO control circuit 141, a first LO circuit 150, a second LO circuit 160, and a switching circuit 148. The LO control circuit 141 has an input port for receiving a compensation control signal 172 from the QMC circuit 170 via a compensation control port 185 of the FETIC 180. Based on the compensation control signal 172, the LO control circuit 141 generates several signals for controlling the carrier frequencies of, and phase relationship between, the first LO circuit 150 and the second LO circuit 160.

In response to these control signals, the first LO circuit 150 is configured to generate a first LO signal 155 having a first carrier frequency, whereas the second LO circuit configured to generate a second LO signal 165 having a second carrier frequency. The LO control circuit 141 receives a target phase shift value from the QMC circuit 170 via the compensation control signal 172. In response to the target phase shift value, the LO control circuit 141 implements a phase shift between the transmission path 102 up-conversion operation and the reception path 104 down-conversation operation. Initially, the LO control circuit 141 sets the second carrier frequency to equal the first carrier frequency. To introduce such a phase shift, the LO control circuit 141 adjusts the second carrier frequency of the second LO signal 165 to deviate from the first carrier frequency of the first LO signal 155 for a phase rotation period. The phase rotation period lasts until it is sufficient to introduce the target phase shift between the first LO signal 155 and the second LO signal 165. Then, the LO control circuit 141 returns the second carrier frequency to be the same as the first carrier frequency.

The first LO circuit 150 includes a first phase lock loop (PLL) circuit 152 and a first local oscillation divider (LOD) 154. The first PLL circuit 152 is controlled by the LO control circuit 141 via a first PLL control signal 142. Configured by the first PLL control signal 142, the first PLL circuit 152 generates a first voltage control oscillation (VCO) signal 153 that oscillates at a first VCO frequency. The first LOD 154 is coupled to the first PLL circuit 152 to receive the first VCO signal 153. The first LOD 154 is configurable by the LO control circuit 141 via a first LOD signal 143. Among other information, the first LOD signal 143 includes a first division word M that indicates a value by which the first VCO frequency is divided.

Configured by the first division word M, the first LOD 154 generates the first LO signal 155 that oscillates at the first carrier frequency, which is set as an M-division of the first VCO frequency. For instance, if the first VCO frequency is 2 GHz and the first division word M is set at 2, then the first carrier frequency of the first LO signal 155 is set at 1 GHz by the first LOD 154. Depending on the particular implementation, the code word M may include an integral number and a fractional number, both of which are predetermined by the LO control circuit 141. The predetermined integral number is used for course adjusting the first carrier frequency while the fractional number is used for fine tuning the first carrier frequency. During the phase rotation period, the code word M remains unchanged to sustain a constant first carrier frequency.

The second LO circuit 160 is separated from and independent of the first LO circuit 150. The second LO circuit 160 includes a second PLL circuit 162 and a second LOD 164. The second PLL circuit 162 is controlled by the LO control circuit 141 via a second PLL control signal 144. Configured by the second PLL control signal 144, the second PLL circuit 162 generates a second VCO signal 163 that oscillates at a first VCO frequency. The second LOD 164 is coupled to the second PLL circuit 162 to receive the second VCO signal 163. The second LOD 164 is configurable by the LO control circuit 141 via a second LOD signal 145. Among other information, the second LOD signal 145 includes a second division word N that indicates a value by which the second VCO frequency is divided.

Configured by the second division word N, the second LOD 164 generates the second LO signal 165 that oscillates at the second carrier frequency, which is set as an N-division of the second VCO frequency. When the transmission path 102 operates within the same carrier band as the reception path 104, the second division word N is set to match with the first division word M. Depending on the particular implementation, the code word N may include an integral number and a fractional number, both of which are predetermined by the LO control circuit 141. The predetermined integral number is used for the course adjusting of the second carrier frequency while the fractional number is used for the fine tuning the second carrier frequency.

During the phase rotation period, the code word N remains unchanged and the second LOD 164 retains the same configuration as before and after the phase rotation period. To effectuate the target phase rotation, the LO control circuit 141 instead adjusts the second VCO frequency inside of the second PLL 162, which has less impact on the mismatch characteristics of the reception path 104. That way, the mismatch characteristics of the reception path 104 would not be perturbed such that the QMC circuit 170 may get a more accurate detection of the reception images. Alternative methods of producing phase rotation between the transmitted and received signals, such as varying a controllable delay circuit between the LOD 164 and the mixer 134, or differing implementations of the LOD circuits 154 and 164, are likely to perturb the mismatch in the reception path 104. This perturbation reduces the accuracy of the QMC circuit 170.

The switching circuit 148 has a first input coupled to the first LO circuit 150 and a second input coupled to the second LO circuit 160. The switching circuit 148 serves as a selection means for selecting an LO signal for the down-conversation operation of the reception path 104. More specifically, the switching circuit 148 is configured to receive a reception LO selection signal 146 from the LO control circuit 141. Configured by the reception LO selection signal 146, the switching circuit 148 delivers at its output one of the first LO signal 155 or the second LO signal 165.

The operation of the switching circuit 148 can be tied to a compensation period, during which the QMC circuit 170 is configured to estimate and compensate distortions caused by impairments in the transmission path 102 and/or the reception path 104. The compensation period typically extends beyond the phase rotation period such that one or more phase rotation periods may take place within a single compensation period. During the compensation period, the switching circuit 148 is configured to deliver the second LO signal 165 as a selected reception LO signal 149. Effectively, the switching circuit 148 couples the second LO circuit 160 to a reception mixer 134 of the reception path 104. That way, the transmission path 102 and the reception path 104 may each be served by a dedicated local oscillator to achieve the phase rotation.

When the compensation period is over, the switching circuit 148 may be configured to deliver the first LO signal 155 as the selected reception LO signal 149. Effectively, the switching circuit 148 couples the first LO circuit 150 to the reception mixer 134 of the reception path 104 once the compensation period is over. That way, the reception path 104 may share the same local oscillator with the transmission path 102 to save power. Alternatively, the switching circuit 148 may continue to deliver the second LO signal 165 as the selected reception LO signal 149 should it be desirable to maintain two separate local oscillation circuits for the transmission path 102 and the reception path 104. Moreover, if the FETS 100 adopts an architecture in which the transmission path 102 and reception path 104 are always served by two separate local oscillation circuits, the switching circuit 148 (along with the reception LO selection signal 146 and the selected reception LO signal 149) may be optionally removed. In that particular architecture, the second LO signal 165 is fed directly to the reception path 104 as the second LO circuit 160 is coupled to the reception mixer 134.

The transmission path 102 includes a digital-to-analog conversion (DAC) modulator 112, a transmission low pass filter 114, a transmission mixer 116, and a pre-power amplifier 118. The DAC modulator 112 is coupled to the data transmission port 183 for receiving a transmission data signal 111. The DAC modulator 112 may receive the transmission data signal 111 directly from the back-end data processing circuit during the compensation period, or in compensated form from the QMC circuit 170 after the compensation period. The DAC modulator 112 converts the transmission data signal 111 according to a predefined modulation scheme of the FETS 100. In one implementation, for example, the DAC modulator 112 converts the transmission data signal 111 according to a quadrature modulation scheme to generate an in-phase signal (a.k.a. the I-channel) and a quadrature signal (a.k.a. the Q-channel). The DAC modulator 112 then converts the modulated signal (s) from its digital form to an analog form, thereby generating a modulated transmission signal 113. The transmission low pass filter (LPF) 114 is coupled to the DAC modulator 112 to receive the modulated transmission signal 113. The transmission LPF 114 is structured to remove spectrum noise and out-of-band signals from the modulated transmission signal 113, thereby generating a filtered transmission signal 115.

The transmission mixer 116 is coupled with the transmission LPF 114 to receive the filtered transmission signal 115. The transmission mixer 116 serves as a part of an up-conversion means for up-converting the transmission signal (e.g., the filtered transmission signal 115 or the modulated transmission signal 113) from a baseband frequency to a carrier frequency controlled by the LO system 140. The transmission mixer 116 may include multiple inputs to generate multiple outputs depending on the modulation scheme the FETS 100 adopts. When a quadrature modulation is used, for example, the transmission mixer 119 may include a first transmission mixer for up-converting the I-channel and a second transmission mixer for up-converting the Q-channel. To separate these two channels, the transmission mixer 116 introduces a 90-degree phase shift between LO signals mixing with the I-channel and the Q-channel. To effectuate the up-conversion operation, the transmission mixer 116 is coupled with the first LO circuit 150 to receive the first LO signal 155. Configured by the first LO signal 155, the first mixer 116 up-converts the filtered transmission signal 115, which is a baseband signal, to a transmission RF signal 117, which is a carrier band signal.

The pre-power amplifier 119 is coupled to the transmission mixer 116 to receive the transmission RF signal 117. When activated, the pre-power amplifier 119 amplifies the transmission RF signal 117 to generate a pre-amplified transmission signal 119. The pre-amplified transmission signal 119 is delivered to the RF transmission port 181 of the FETIC 180. The transmission antenna 122 is coupled with the RF transmission port 181 to receive the pre-amplified transmission signal 119 for transmission. The FETS 100 may include a power amplifier to further amplify the pre-amplified transmission signal 119 before being transmitted by the transmission antenna 122.

During the compensation period, the transmission path 102 is coupled with the reception path 104 to implement a direct feedback mechanism for estimating and removing image interferences caused by channel impairments. The direct feedback mechanism involves duplicating the transmission RF signal 117 (or the pre-amplified transmission signal 119) and providing the duplicate as a feedback to the reception channel 104. The FETS 100 includes a feedback generator 123 and a reception switch 127 to implement this feedback mechanism. The feedback generator 123 is configured to generate a feedback reception RF signal 125. The feedback reception RF signal 125 can be a direct duplicate, attenuated duplicate, and/or a coupler duplicate of the transmission RF signal 117. Thus, the feedback generator 123 can be a directional coupler that is configured to provide a coupler duplicate of the transmission RF signal 117. The reception switch 127 has at least two input ports. The first input port of the reception switch 127 is configured to receive the feedback reception RF signal 125. The second input port of the reception switch 127 is coupled to the reception antenna 124 to receive a reception RF signal 126. The reception switch 127 is configured to select one of the feedback reception RF signal 125 or the reception RF signal 126. During the compensation period, the reception path 104 can be configured to operate with a direct feedback mode. In this mode, the reception switch 127 is configured to select the feedback reception RF signal 125. After the compensation period, the reception path 104 can be switched back to the regular reception mode. In this mode, the reception switch 127 is configured to select the reception RF signal 126. Based on this selection process, the reception switch 127 generates a selected reception RF signal 131, which is delivered to the FETIC 180 via the RF reception port 182. In an alternative implementation, the reception switch 127 may be a part of the FETIC 180, such that the feedback reception RF signal 125 and the reception RF signal 126 are received via two separate RF reception ports (e.g., the RF reception port 182). In this configuration, the feedback reception RF signal 125 and the reception RF signal 126 may be amplified individually before entering the FETIC 180.

The reception path 102 includes a matching amplifier 132, a reception mixer 134, a reception low pass filter 136, and an analog-to-digital (ADC) demodulator 138. The matching amplifier 132 is coupled with the RF reception port 182 to receive the selected reception RF signal 131. When activated, the matching amplifier 132 amplifies the power of the selected reception RF signal 131, which can be a multiplexed version of the feedback reception RF signal 125 or the reception RF signal 126. The matching amplifier 132 also matches the input impedance of the RF reception port 182 to maximize the power conversion. As a result of the amplification, the matching amplifier 132 generates an amplified reception RF signal 133.

The reception mixer 134 is coupled with the matching amplifier 132 to receive the amplified reception RF signal 133. The reception mixer 134 serves as a part of a down-conversion means for down-converting the reception signal (e.g., the feedback reception RF signal 125 or the reception RF signal 126) from a carrier frequency to a baseband frequency according to the LO frequency of the selected reception LO signal 149. The reception mixer 134 may include multiple inputs to generate multiple outputs depending on the demodulation scheme the FETS 100 adopts. For instance, the amplified reception RF signal 133 can be a pair of differential signals, meaning that it includes two RF signals with the same magnitude but opposite polarities. To work with this pair of differential signals, the reception mixer 134 may include two input ports. Also, the reception path 104 may be adapted to a quadrature demodulation scheme, under which the reception mixer 134 may have at least two output ports—a first one for delivering a down-converted in-phase signal (e.g., the I-channel) and a second one for delivering a down-converted quadrature signal (e.g., the Q-channel). In the event that the reception mixer 134 receives a pair of differential signals, the reception mixer 134 may have four output ports—a first pair for delivering a differential pair of down-converted in-phase signals and a second pair for delivering a differential pair of down-converted quadrature signals.

During the compensation period, the reception mixer 134 is coupled with the second LO circuit 160 via the reception LO switching circuit 148. In particular, the reception mixer 134 is configured to receive the second LO signal 165 as the selected reception LO signal 149 via the output of the switching circuit 148. Accordingly, the reception mixer 134 is configured to down-convert the reception RF signal (e.g., the feedback reception RF signal 125 or the reception RF signal 126) based on the second LO signal 165 during the compensation period. During the phase rotation period, the LO system 140 is configured to implement a phase rotation between the first LO circuit 150 and the second LO circuit 160. The reception mixer 134 may begin the down-conversion process outside of the phase rotation period. In one implementation, for example, the reception mixer 134 is configured to down-convert the reception RF signal (e.g., 133 or 131 if the matching amplifier 132 is optionally removed) based on the second LO signal 165 before the phase rotation period begins. In another implementation, for example, the reception mixer 134 is configured to down-convert the reception RF signal based on the second LO signal 165 after the phase rotation period is completed.

As a result of the down-conversion operation, the reception mixer 134 generates a reception signal 135, which is a baseband signal as it is no longer in the RF band. The reception signal 135 incurs the phase shift introduced by the second LO signal 165 during the phase rotation period. Thus, the reception signal 135 has a phase rotation relationship with the transmission signal (e.g., the filtered transmission signal 115 or the modulated transmission signal 113 if the transmission LPF 114 is removed). To effectuate this phase rotation relationship, the LO control circuit 141, in conjunction with the first PLL 152 and the second PLL 162, serve as a phase rotation means for implementing a target phase shift between the first LO signal 155 and the second LO signal 165.

The reception low pass filter (LPF) 136 is coupled with the reception mixer 134 to receive the reception signal 135. The reception LPF 136 is structured to remove noise and image interferences from the reception signal 135, thereby generating a filtered reception signal 137. The ADC demodulator 138 is coupled with the reception LPF 136 to receive the filtered reception signal 137. The ADC demodulator 138 demodulates the reception signal (e.g., the filtered reception signal 137 or the reception signal 135 if the reception LPF 136 is removed) according to a predefined demodulation scheme of the FETS 100. In one implementation, for example the ADC demodulator 138 demodulates the reception signal according to a quadrature modulation scheme to combine the I-channel and Q-channel of the reception signal.

The ADC demodulator 138 then converts the demodulated signal from its analog form to a digital form, thereby generating a reception data signal 139. The reception data signal 139 is delivered to the data reception port 184, which is coupled with the QMC circuit 170. Based on the reception data signal 139, the QMC circuit 170 detects the reception image caused by the impairments in the reception path 104. From there, the QMC circuit 170 is able to estimate the transmission image caused by the impairments in the transmission path 102. Consequently, the QMC circuit 170 can carry out one or more operations to compensate the impairments of the transmission path 102.

The FETS 100 can be deployed in a communication system in which beamforming techniques are used. Beamforming techniques enhance the energy efficiency of the communication network by spreading the transmission energy over multiple transmitters (e.g., the I-channel and the Q-channel) whose combined transmission energy is supposed to be similar to the transmission energy generated by a single transmission system. However, a successful beamforming process relies on the proper coordination of multiple transmitters, including the phase relationship thereof. Thus, the FETS 100 provides a means for effectively and accurately rotating the relative phase of a transmitted signal without substantially increasing the form factor of the communication system.

In one aspect, the FETIC 180 of the FETS 100 provides an on-chip solution for phase rotation. Such an on-chip solution eliminates bulky and expensive discrete components and thus helps maintain a small form factor (e.g., board size) for the communication system. In another aspect, the FETIC 180 performs the phase rotation outside of the local oscillation distribution path to minimize the mismatch variance (i.e., changes in impairments) of the feedback path (e.g., the reception path 104 receiving the feedback reception RF signal 125). The local oscillation distribution path includes the second LOD 164 and the reception mixer 134. The FETIC 180 manages to introduce a target phase shift to the second LO signal 165 by adjusting the second PLL 162 internally. As a result, the FETIC 180 does not perturb the impairments along the local oscillation distribution path while performing the phase rotation operation. Thus, the FETIC 180 is able to suppress the gain mismatch variation and the phase mismatch variation of the feedback path. Simulation results have shown for instance, that the FETIC 180 is able to keep the gain mismatch variation below 0.2% and the phase mismatch variation below 0.1 degree. Advantageously, the FETIC 180 enhances the accuracy of the reception image estimation performed by the QMC circuit 170.

Figure 2:
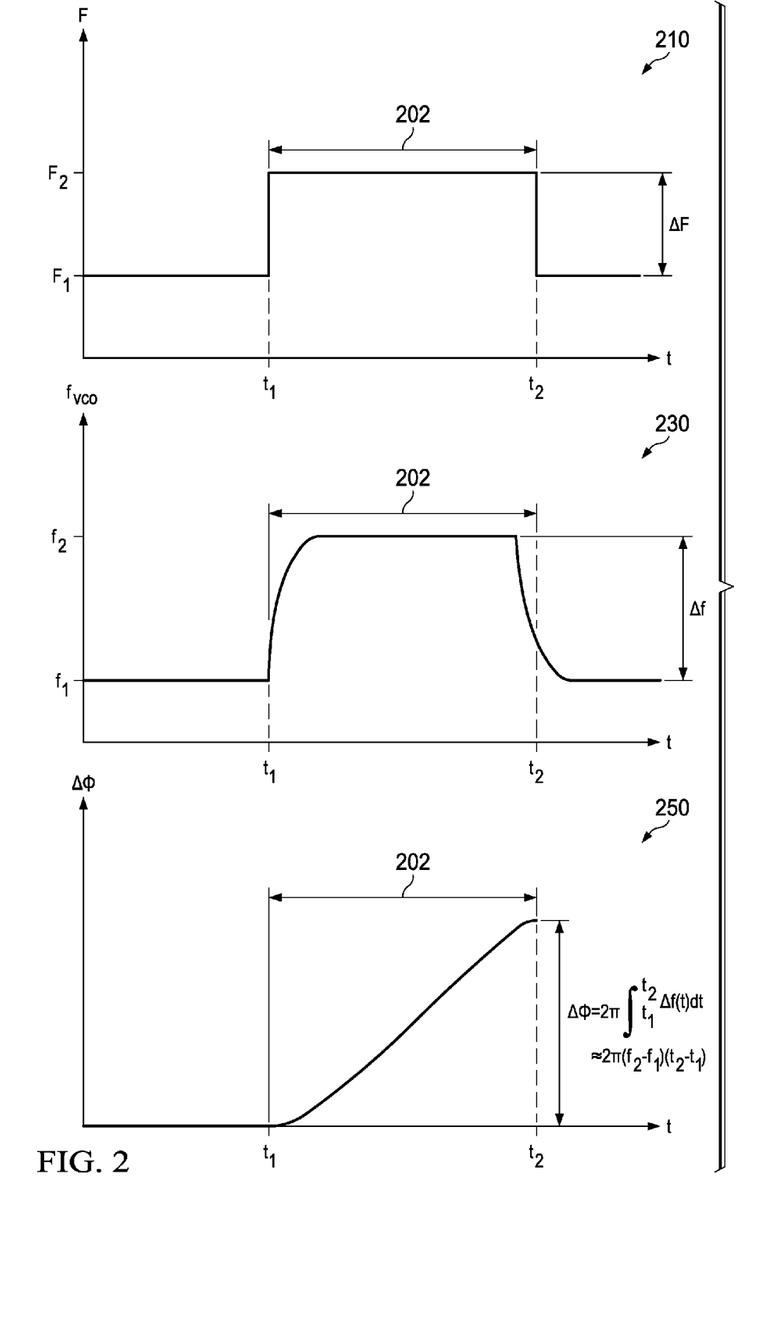
FIG. 2 shows transient diagrams related to an exemplary phase rotation scheme according to an aspect of the present disclosure.

The disclosed phase rotation operation can be further understood according to FIG. 2, which shows several transient diagrams related to the internal adjustment of the second PLL 162. The fractional control transient diagram 210 shows the transient value of a fractional control parameter (F) for controlling the VCO frequency of the second VCO signal 163. The VCO frequency transient diagram 230 shows the transient VCO frequency ($f_{VCO}$) of the second VCO signal 163 in response to the adjustment made in the fractional control parameter (F). The phase rotation transient diagram 250 shows the transient phase rotation (ΔΦ) introduced to the second VCO signal 163 as a result of the change in VCO frequency ($f_{VCO}$).

Referring to the fractional control transient diagram 210, a phase rotation period 202 may begin at an initial time $t_1$ and end at an end time $t_2$. The LO control circuit 141 as shown in FIG. 1 may be used for controlling and adjusting the phase rotation period 202. At the initial time $t_1$, the value of the fractional control parameter (F) is increased from an initial fractional control value (F1) to an adjusted fractional control value (F2). In general, the second PLL 162 is configured to adjust the VCO frequency ($f_{VCO}$) based on the fractional control parameter (F). An increase in the fractional control parameter (ΔF) for instance, may cause the second PLL 162 to increase the VCO frequency by a frequency deviation (Δf).

Referring to the VCO frequency transient diagram 230, the frequency deviation (Δf) is measured between a nominal VCO frequency ($f_1$), which is based on the first VCO frequency of the first VCO signal 153, and an adjusted VCO frequency ($f_2$), which is introduced as a result of the change in the fractional control parameter (ΔF). In one implementation, the nominal frequency (f1) is set as the second VCO frequency, which is the same as the first VCO frequency, outside of the phase rotation period 202. As shown in FIG. 1, the second VCO frequency is a multiple (N) of the second carrier frequency. Provided that the first LOD 154 and the second LOD 164 have the same divider coefficient (i.e., M=N), the second carrier frequency of the second LO signal 165 is the same as the first carrier frequency of the first LO signal 155 before and after the phase rotation period 202.

The adjusted VCO frequency ($f_2$) is set as the second VCO frequency, which deviates from the first VCO frequency, during the phase rotation period 202. Provided that the first LOD 154 and the second LOD maintain the same divider coefficient (i.e., M=N), the second carrier frequency deviates from the first carrier frequency during the phase rotation period 202. When implemented sufficiently long, the frequency deviation (Δf) introduces a phase shift (ΔΦ) between the first VCO signal 153 and the second VCO signal 163. This phase shift (ΔΦ) can be maintained at the LO signal level (e.g., the first LO signal 155 and the second LO signal 165) or stepped down by the local oscillation dividers (e.g., the first LOD 154 and the second LOD 164) according to one or more dividing coefficients. The phase shift (ΔΦ) may be exactly the same as the target phase shift prescribed by the QMC circuit 170. Alternatively, the phase shift (ΔΦ) may be an approximation of the target phase shift prescribed by the QMC circuit 170.

As shown in the phase rotation transient diagram 250, the phase shift (ΔΦ) increases with the integrated area of the frequency deviation (Δf) over a portion of the rotation period 202. So long as the frequency deviation (Δf) is less than the loop bandwidth of the first and second PLLs 152 and 162, the faster VCO signal (e.g., the second VCO signal 163 at the adjusted VCO frequency ($f_2$)) will lead the slower VCO signal (e.g., the first VCO signal 143 at the nominal VCO frequency ($f_1$)) for every oscillation cycle. This phase lead is accumulated over the phase rotation period 202. Thus, a longer phase rotation period 202 results in a greater phase shift (ΔΦ). In general, the phase shift (ΔΦ) can be defined by Equation 1 below:

$$\Delta\Phi = 2\pi \int \Delta f(t) dt \qquad \text{Eq. (1)}$$

Assuming the falling edge and rising edge of the VCO frequency are symmetric across the phase rotation period 202, Equation 1 can be approximated by Equation 2 below:

$$\Delta\Phi = 2\pi (f_2 - f_1) \cdot (t_2 - t_1) \qquad \text{Eq. (2)}$$

Thus, the phase shift ($\Delta\Phi$) can be understood as a multiplication product of the phase rotation period 202 (i.e., $t_2-t_1$) and a scaled difference between the second carrier frequency and the first carrier frequency (i.e., $f_2-f_1$). In an implementation where the QMC circuit 170 communicates a target phase shift to the LO control circuit 141 via the compensation control signal 172. The LO control circuit 141 can derive a phase rotation period 202 that is sufficiently long to implement the target phase shift provided that the second PLL 162 has one or more preset frequency deviation ($\Delta f$) levels. As illustrated in FIG. 2, the phase rotation (or phase shift) operation of the present disclosure is performed outside of the LO distribution path because it does not involve the adjustment of any of the local oscillation dividers (e.g., the first LOD 154 and second LOD 164). Thus, the disclosed phase rotation operation minimizes the impairment perturbation introduced to the feedback path during the compensation period.

Although FIG. 2 shows that a positive phase shift (i.e., $\Delta\Phi>0$) can be achieved by introducing a positive frequency deviation (i.e., $\Delta f>0$) to the second VCO signal 163, a negative phase shift (i.e., $\Delta\Phi<0$) may be similarly achieved by introducing a negative frequency deviation (i.e., $\Delta f<0$) to the second VCO signal 163. As an example, a negative frequency deviation can be introduced by setting the adjusted VCO frequency ($f_2$) to be less than the nominal VCO frequency ($f_1$). Thus, depending on the target phase shift determined by the QMC circuit 170, the phase shift ($\Delta\Phi$) between the first and second LO signals 155 and 165 can be achieved by increasing or decreasing fractional control parameter (F) during the phase rotation period 202.

Figure 3A:
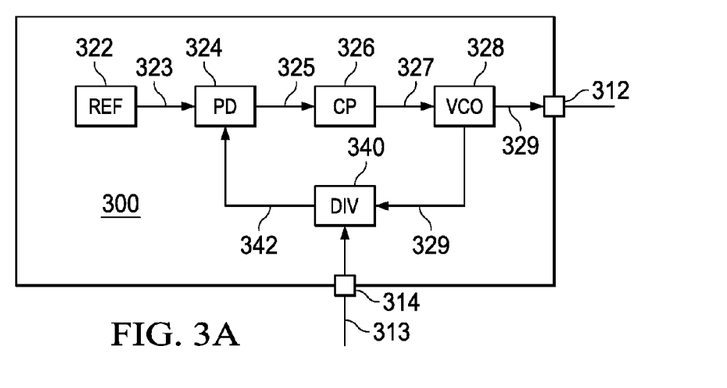
FIG. 3A shows a schematic view of an exemplary phase lock loop according to an aspect of the present disclosure.
Figure 3B:
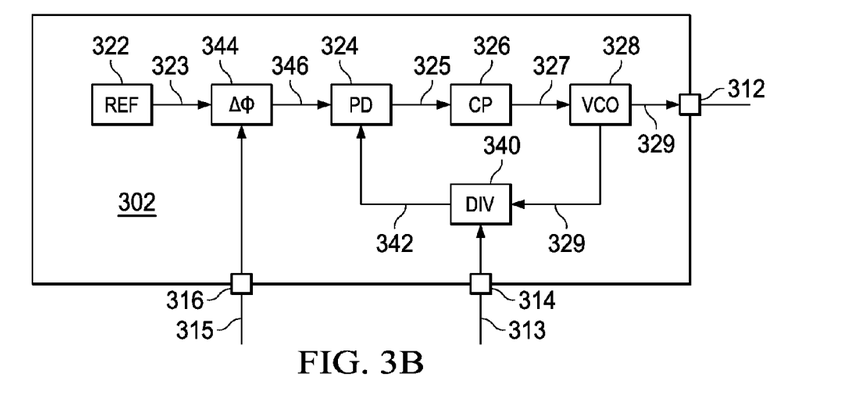
FIG. 3B shows a schematic view of an alternative phase lock loop according to another aspect of the present disclosure.

The phase rotation operation as shown in FIG. 2 is effectuated by the second PLL 162 and in conjunction with the LO control circuit 141. There are several ways to implement the second PLL 162. By way of illustration, FIGS. 3A and 3B provide two exemplary implementations of the second PLL 162 that are consistent with the descriptions of FIGS. 1 and 2. Referring to FIG. 3A, the phase lock loop 300 includes a reference generator (REF) 322, a phase detector (PD) 324, a charge pump circuit (CP) 326, a voltage control oscillator (VCO) 328, and a frequency divider 340. Although the PLL 300 is described as a hardware system, various components in the PLL 300 can be implemented in digital form as well. In one implementation, for example, the PLL 300 can be a digital PLL that is integratable with the LO control circuit 141.

The VCO 328 is configured to receive an oscillation control voltage 327 from the charge pump circuit 326. Based on the control voltage 327, the VCO 328 generates a VCO signal 329 at a VCO frequency. The VCO frequency can be tuned by adjusting the control voltage 327. In search for a lock point, the VCO signal 329 is fed back to the frequency divider 340. The frequency divider 340 is a separate apparatus from the local oscillation divider (e.g., the first LOD 154 and the second LOD 164) as the frequency divider 340 is outside of the local oscillation distribution path. Thus, adjustments made to the frequency divider 340 do not perturb the impairment characteristics of the local oscillation distribution path.

The frequency divider 340 is configured to receive a frequency divider signal 313 via a control port 314 of the PLL 300. The frequency divider signal 313 is a part of the PLL control signal (e.g., the second PLL control signal 144) generated by the LO control circuit 141 (see FIG. 1). The frequency divider signal 313 carries a division code that includes an integral value and a fractional value. The integral value is used for coarse adjusting the VCO frequency, whereas the fractional value is used for fine tuning the VCO frequency.

Both the integral value and the fractional value can be a part of the fractional control parameter (F) as described in FIG. 2. In general, the sum of the integral value and the fractional value is used as a counter input to reduce the VCO frequency. More specifically, the sum of the integral value and the fractional value can be used for dividing the VCO frequency. As a result of the division operation, the frequency divider 340 generates a feedback oscillation signal 342. For instance, the frequency divider 340 may receive a division code (via the frequency divider signal 313) that has an integral value of 2 and a fractional value of 0.2. Thus, the total of the division code is 2.2. Assuming the VCO frequency is at 1 GHz, the frequency divider 340 is configured to generate the feedback oscillation signal 342 at 1 GHz/2.2=455 MHz.

Typically, the frequency deviation ($\Delta f$) is relatively small in a phase rotation operation. Thus, it may be more precise and efficient for the LO control circuit 141 to alter the fractional value of the divisional code in order to introduce the frequency deviation ($\Delta f$). In one implementation, for example, the integral value of the division code corresponds to the first carrier frequency of the first LO signal 155, whereas the fractional value corresponds to the frequency deviation between the first and second LO signals 155 and 165. To implement the target phase shift, the LO control circuit 141 keeps the integral value unchanged during the phase rotation period while altering the fractional value. More specifically, the LO control circuit 141 may increase the fractional value to effectuate a positive target phase shift or alternatively, decrease the fractional value to effectuate a negative target phase shift.

In operation, an increased fractional value (or more generally, an increased division code) leads to a greater division of the VCO frequency, which causes the feedback oscillation signal 342 to have a lower feedback oscillation frequency. The reference generator 322 is configured to generate a reference oscillation signal 323 at a reference frequency. The phase detector (or a phase-frequency detector) 324 is coupled with the reference generator 322 and the frequency divider 340. The phase detector 324 compares the frequency and phase of the reference oscillation signal 323 and the feedback oscillation signal 342. When the reference oscillation signal 323 has a higher frequency than, or a phase lead over, the feedback oscillation signal 342, the phase detector 324 is configured to generate a phase difference signal 325 with a positive value.

The positive phase difference signal 325 is then amplified by the charge pump circuit 326, which generates the control voltage 327 as a result of such amplification. Thus, an increased fractional value causes the control voltage 327 to increase, and accordingly, the increased control voltage 327 tunes up the VCO frequency of the VCO signal 329. As described in FIG. 2, this increased VCO frequency effectuates a positive frequency deviation (i.e., $\Delta f>0$). The VCO signal 329 at the increased VCO frequency is delivered to an output port 312, which is connected to a local oscillation divider such as the second LOD 164. As a result, a positive phase shift (i.e., $\Delta\Phi>0$) is developed between the second LO signal 165 and the first LO signal 155 during the phase rotation period.

In contrast, a decreased fractional value (or generally, a decreased division code) leads to a smaller divider of the VCO frequency, which causes the feedback oscillation signal 342 to have a higher feedback oscillation frequency.

When the reference oscillation signal 323 has a lower frequency than, or a phase lag behind, the feedback oscillation signal 342, the phase detector 324 is configured to generate the phase difference signal 325 with a negative value. The negative phase difference signal 325 is then amplified by the charge pump circuit 326, which generates the control voltage 327 as a result of such amplification. Thus, a decreased fractional value causes the control voltage 327 to decrease, and accordingly, the decreased control voltage 327 tunes down the VCO frequency of the VCO signal 329. As described in FIG. 2, this decreased VCO frequency effectuates a negative frequency deviation (i.e., $\Delta f<0$). Hence, a negative phase shift (i.e., $\Delta\Phi<0$) is developed between the second LO signal 165 and the first LO signal 155 during the phase rotation period.

FIG. 3B shows an alternative phase lock loop (PLL) 302 according to another aspect of the present disclosure. The PLL 302 includes all the components of the PLL 300 and with the addition of a reference control circuit 344. The basic operation of the PLL 302 is similar to that of the PLL 300. The phase rotation operation however, is performed at the reference generator 322 level. Instead of adjusting the divider code to effectuate a target phase shift, the PLL 302 introduces the phase shift by using the reference control circuit 344. The reference control circuit 344 can be programmed by the LO control circuit 141 via a reference control signal 315. The PLL 302 includes a reference control port 316 for receiving the reference control signal 315.

The reference control signal 315 is used for introducing a delay (or a phase shift) in the reference oscillation signal 323. Moreover, the reference control circuit 344 may adjust the reference frequency of the reference oscillation signal 323 by a fraction of the reference frequency. This fractional adjustment is used for introducing the target phase shift as described in FIGS. 1 and 2. As a result of these adjustments, the reference control circuit 344 generates an adjusted reference oscillation signal 346.

The phase detector 324 is coupled with the reference control circuit 344 to receive the adjusted reference oscillation signal 346. Like in the PLL 300, the phase detector 324 in PLL 302 is also coupled with the frequency divider 340 to receive the feedback oscillation signal 342. The phase detector 324 compares the frequency and phase of the adjusted reference oscillation signal 346 and the feedback oscillation signal 342. As a result of such comparison, the phase detector 324 coordinates with the charge pump circuit 326 to generate the control voltage 327. The VCO 329 then adjusts the VCO frequency of the VCO signal 329 based on the control voltage 327. The VCO signal 329 is then fed back to the frequency divider 340 in search for a lock point. Under this phase lock mechanism, the PLL 302 phase-locks the VCO signal 329 at the same frequency and phase as the adjusted reference oscillation signal 346. Thus, the target phase shift can be imposed on the VCO signal 329 via the reference control circuit 344.

Figure 4:
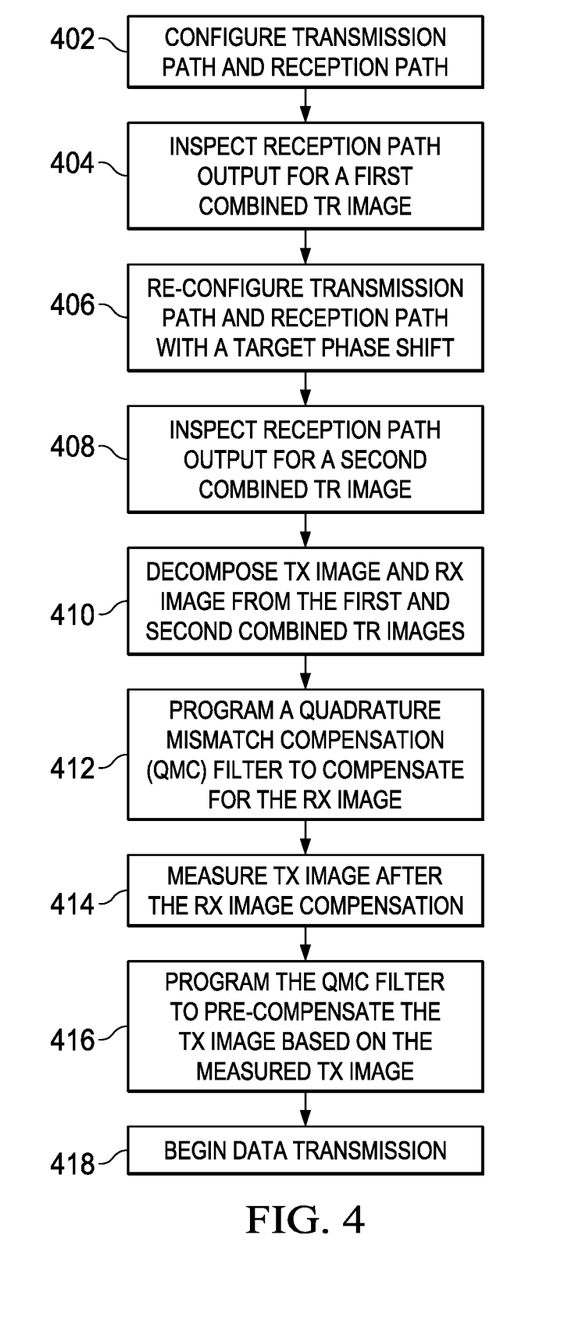
FIG. 4 shows a flow diagram of an exemplary method for correcting IQ imbalance according to an aspect of the present disclosure.

FIG. 4 shows a flow diagram of an exemplary method 400 for correcting IQ imbalance according to an aspect of the present disclosure. The method 400 can be performed by the FETS 100, and more pertinently by the QMC circuit 170 in conjunction with the local oscillation system 140 as shown and described in FIG. 1. In step 402, the FETS 100 configures the transmission path 102 and the reception path 104 for calibration. In step 404, the QMC circuit 170 begins the compensation period by inspecting the reception path output (e.g., the reception data signal 139 delivered at the data reception port 184) for a first combined TR image. The first combined TR image is a combination of a transmission (TX) image and a reception (RX) image. As described above, the TX image is created by gain and phase mismatches attributed by the impairments along the transmission path 102, whereas the RX image is created by gain and phase mismatches attributed by the impairments along the reception path 104 (or the feedback path).

Based on the first detected TR image, the QMC circuit 170 determines a target phase shift value. In step 406, the QMC circuit 170 initiates a reconfiguration on the transmission path 102 and the reception path 104 to implement the target phase shift. As an example, the QMC circuit 170 may communicate the target phase shift value to the LO control circuit 141 via the compensation control signal 172. The LO control circuit 141 may then implement the phase shift during a phase rotation period and in a manner that is consistent with the descriptions of FIGS. 1-2 and 3A-3B.

After the phase rotation period, the QMC circuit 170 then inspects the reception path output for a second combined TR image in step 408. Based on this second round inspection, the QMC circuit 170 is able to distinguish the RX image from the TX image. As a result, the QMC circuit 170 is enabled to decompose the RX image from the TX image by using the first and second combined TR images in step 410. After the image decomposition, the FETS 100 programs a QMC filter (e.g., the QMC circuit 170) to compensate for or remove the RX image in the reception path output in step 412.

With the RX image taken out of the reception path output, the QMC circuit 170 is enabled to measure the TX image in step 414. In step 416, the FETS 100 then programs the QMC circuit 170 to pre-compensate the TX image in the transmission path 102 based on the measured TX image. After that, the FETS 100 may conclude the compensation period and begin the data transmission operation in step 418.

Figure 5:
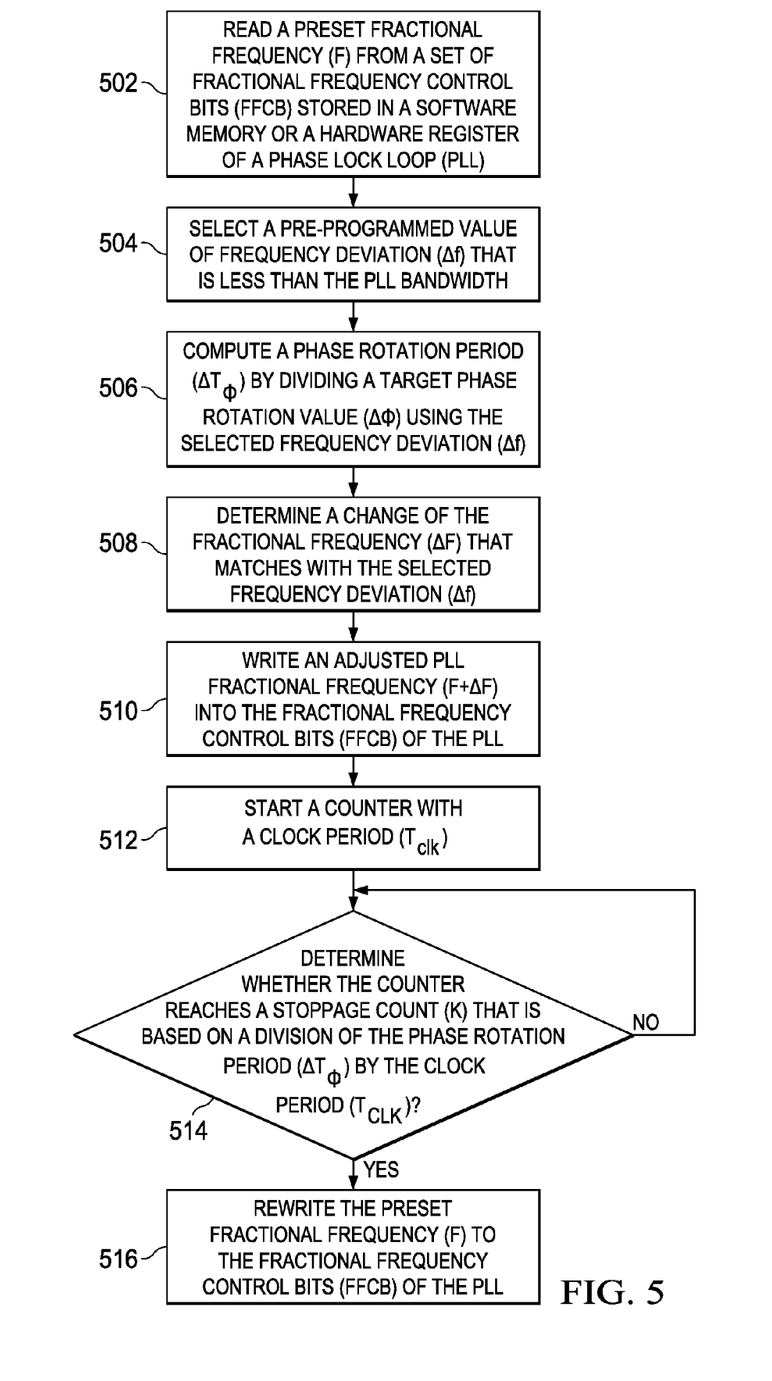
FIG. 5 shows a flow diagram of an exemplary method for implementing a phase rotation scheme according to an aspect of the present disclosure.

Step 406 of the method 400 can be performed in a number of ways. By way of illustration, FIG. 5 shows an exemplary method 500 for implementing a phase rotation scheme consistent with the description of step 406. The method 500 can be performed by the LO control circuit 141 in conjunction with the first and second PLL circuits 152 and 162. In a software implementation, the LO control circuit 141 and the first and second PLL circuits 152 and 162 can be realized in a single computing unit within the FETIC 180. This single computing unit includes a processing module and a storage module. The storage module stores a set of programming instructions that are readable and implementable by the processing module. Upon compiling and executing these instructions, the processing module is configured to perform the following steps of the method 500.

In step 502, the LO control circuit 141 reads a preset fractional frequency (F) from a set of fractional frequency control bits (FFCB) stored in a software memory or a hardware register associated with a phase lock loop (PLL). The PLL can be implemented according to the description of the second PLL 162 as shown in FIG. 1 and/or the PLL 300 as shown in FIG. 3A. The fractional frequency control bits (FFCB) implements the fractional control parameter as described in FIG. 2. And the preset fractional frequency (F) corresponds to the initiate fractional control value ($F_1$) as described in FIG. 2 as well. Accordingly, the preset fractional frequency (F) is associated with the first carrier frequency of the first LO signal 155 as described in FIG. 2.

In step 504, the LO control circuit 141 select a pre-programmed value of the frequency deviation ($\Delta f$) that is less than the PLL bandwidth. In step 506, the LO control circuit 141 computes a phase rotation period ($\Delta T_\Phi$) according to Equations (1) and/or (2) as described above. For instance, the LO control circuit 141 may compute the phase rotation period ($\Delta T_\Phi$) by dividing a target phase rotation value ($\Delta\Phi$) using the selected frequency deviation ($\Delta f$). The target phase rotation value ($\Delta\Phi$) may be stored in the LO control circuit 141, or alternatively, it can be communicated to the LO control circuit 141 by the QMC circuit 170.

In step 508, the LO control circuit 141 determines a change of the fractional frequency ($\Delta F$) that matches with the selected frequency deviation ($\Delta f$). In one implementation, the LO control circuit 141 may include a look-up table that corresponds a set of fractional frequency ($\Delta F$) with a set of frequency deviation ($\Delta f$) selection. In step 510, the LO control circuit writes an adjusted PLL fractional frequency into the FFCB memory or the FFCB register. Depending on the direction of the target phase rotation value ($\Delta\Phi$), the adjusted PLL fraction frequency (F+$\Delta F$) may be greater than or less than the preset fractional frequency (F). The adjusted fractional frequency effectuates a change in VCO frequency of the PLL. If $\Delta F$ has a positive value, the VCO frequency is set to increased; or if $\Delta F$ has a negative value, the FCO frequency is set to decrease.

In step 512, the LO control circuit 141 starts a counter with a clock period ($T_{CLK}$). The first count of the counter marks the beginning of the phase rotation period (T$\Delta_\Phi$). The clock period ($T_{CLK}$) is less than the phase rotation period ($\Delta T_\Phi$). For precision control, the phase rotation period ($\Delta T_\Phi$) is a multiple (K) of the clock period ($T_{CLK}$). In step 514, the LO control circuit 141 determines whether the counter reaches a stoppage count (K). If the stoppage count (K) is not reached, the method 500 returns to the beginning of step 514 and repeats another clock period ($T_{CLK}$) to continue the phase rotation period ($\Delta T_\Phi$). As the counter increases its count, the phase shift between the LO signals (e.g., the first and second LO signals 155 and 165) incases with the number of lapsed clock period ($T_{CLK}$) because one LO signal oscillates at a higher frequency than the other LO signal.

If the stoppage count (K) is reached, the phase rotation period ($\Delta T_\Phi$) is over, and the phase shift has accumulated to an amount that is the same as, or an approximation of, the target phase rotation value ($\Delta\Phi$). As a result, the method 500 proceeds to step 516, in which the LO control circuit 141 rewrites the preset fractional frequency (F) to the FFCB of the PLL. That way, the LO signals (e.g., the first and second LO signals 155 and 165) may oscillate at the same carrier frequency again.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the methods and/or operations described (such as a program encoded in a computer-readable medium, which can be a memory device, a storage device, a machine-readable storage substrate, or other physical, machine-readable medium, or a combination of one or more of them).

Consistent with the present disclosure, the term "configured to" purports to describe the structural and functional characteristics of one or more tangible non-transitory components. For example, the term "configured to" can be understood as having a particular configuration that is designed or dedicated for performing a certain function. Within this understanding, a device is "configured to" perform a certain function if such a device includes tangible non-transitory components that can be enabled, activated, or powered to perform that certain function. While the term "configured to" may encompass the notion of being configurable, this term should not be limited to such a narrow definition. Thus, when used for describing a device, the term "configured to" does not require the described device to be configurable at any given point of time.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. An integrated circuit comprising:
a first local oscillation (LO) circuit;
a first mixer coupled with the first LO circuit;
a second LO circuit;
a second mixer coupled with the second LO circuit; and
a switching circuit having a first input, a second input, and an output, the first input coupled to the first LO circuit, the second input coupled to the second LO circuit, and the output coupled to the second mixer.

2. The integrated circuit of claim 1, wherein:
the first LO circuit is configured to generate a first LO signal having a first carrier frequency;

the first mixer is configured to up-convert a baseband signal to a transmission radio frequency (RF) signal based on the first carrier frequency of the first LO signal;

the second LO circuit is configured to generate a second LO signal having a second carrier frequency deviating from the first carrier frequency for a phase rotation period sufficient to introduce a phase shift between the first LO signal and the second LO signal; and the second mixer is configured to down-convert a reception RF signal based on the second LO signal outside of the phase rotation period.

3. The integrated circuit of claim 2, wherein the reception RF signal is a duplicate of the transmission RF signal.

4. The integrated circuit of claim 2, wherein the second LO circuit is configured to generate the second LO signal having the first carrier frequency before and after the phase rotation period.

5. The integrated circuit of claim 2, wherein the phase shift includes a multiplication product of the phase rotation period and a difference between the second carrier frequency and the first carrier frequency.

6. The integrated circuit of claim 2, wherein the second LO circuit includes a phase lock loop (PLL) circuit having:
a voltage controlled oscillator (VCO) configured to generate a VCO signal having a VCO frequency; and
a frequency divider coupled to the VCO, the frequency divider configured to divide the VCO frequency with an integral value and a fractional value, the integral value corresponds to the first carrier frequency and remained unchanged during the phase rotation period, the fractional value altered during the phase rotation period to effectuate a frequency deviation between the second carrier frequency and the first carrier frequency.

7. The integrated circuit of claim 6, wherein:
the fractional value is increased during the phase rotation period based on a target phase shift value;
the PLL circuit includes a detector circuit coupled with the frequency divider and the VCO, the detector circuit configured to increase a controlled voltage based on the increased fractional value; and
the VCO is configured to increase the VCO frequency based on the increased controlled voltage.

8. The integrated circuit of claim 2, wherein:
the switching circuit is configured to couple the second LO circuit to the second mixer before a compensation period is over,
the switching circuit is configured to couple the first LO circuit to the second mixer after the compensation period is over; and
the compensation period extends beyond the phase rotation period.

9. A front-end (FE) transceiver comprising:
a first local oscillation (LO) circuit;
a first mixer coupled with the first LO circuit;
a second LO circuit;
a directional coupler coupled with the first mixer; and
a second mixer coupled with the directional coupler; and
a switching circuit having a first input, a second input, and an output, the first input coupled to the first LO circuit, the second input coupled to the second LO circuit, and the output coupled to the second mixer.

10. The FE transceiver of claim 9, wherein:
the first LO circuit is configured to generate a first LO signal having first carrier frequency;

the first mixer configured to up-convert a baseband signal to a transmission radio frequency (RF) signal based on the first carrier frequency of the first LO signal;

the second LO circuit is configured to generate a second LO signal having a second carrier frequency deviating from the first carrier frequency for a phase rotation period sufficient to implement a phase shift between the first LO signal and the second LO signal;

the directional coupler is configured to generate a feedback RF signal correlating with the transmission RF signal; and the second mixer is configured to receive the feedback RF signal and down-convert the feedback RF signal based on the second LO signal outside of the phase rotation period.

11. The FE transceiver of claim 10, wherein the phase shift includes a multiplication product of the phase rotation period and a difference between the second carrier frequency and the first carrier frequency.

12. The FE transceiver of claim 10, wherein the second LO circuit includes a phase lock loop circuit having:
a voltage controlled oscillator (VCO) configured to generate a VCO signal having a VCO frequency; and
a frequency divider coupled to the VCO, the frequency divider configured to divide the VCO frequency with an integral value and a fractional value, the integral value corresponds to the first carrier frequency and remained unchanged during the phase rotation period, the fractional value altered during the phase rotation period to effectuate a frequency deviation between the second carrier frequency and the first carrier frequency.

13. A method, comprising:
generating, by a first local oscillation (LO) circuit, a first LO signal having a first carrier frequency;
up-converting, by a first mixer coupled with the first LO circuit, a baseband signal to a transmission radio frequency (RF) signal based on the first carrier frequency of the first LO signal;
generating, by a second LO circuit, a second LO signal having a second carrier frequency deviating from the first carrier frequency for a phase rotation period sufficient to introduce a phase shift between the first LO signal and the second LO signal; and
down-converting, by a second mixer coupled with the second LO circuit, a reception RF signal based on the second LO signal outside of the phase rotation period.

14. The method of claim 13, wherein the reception RF signal is a duplicate of the transmission RF signal.

15. The method of claim 13, wherein the generating the second LO signal is performed before and after the phase rotation period.

16. The method of claim 13, wherein the phase shift includes a multiplication product of the phase rotation period and a difference between the second carrier frequency and the first carrier frequency.

17. The method of claim 13, wherein:
the generating the first LO signal includes:
generating, by a first phase lock loop (PLL) circuit in the first LO circuit, a first voltage control oscillation (VCO) signal having a first VCO frequency; and
dividing, by a first LO divider in the first LO circuit, the first VCO frequency with a predetermined number to generate the first LO signal; and
the generating the second LO signal includes:
generating, by a second phase lock loop (PLL) circuit in the second LO circuit, a second VCO signal having a second VCO frequency; and dividing, a second LO divider in the second LO circuit, the second VCO frequency with the predetermined number to generate the second LO signal.

18. The method of claim 13, wherein the generating the second LO signal includes:
   generating, by a voltage controlled oscillator (VCO) in the second LO circuit, a VCO signal having a VCO frequency; and
   dividing, by a frequency divider in the second LO circuit, the VCO frequency with an integral value and a fractional value, the integral value corresponds to the first carrier frequency and remained unchanged during the phase rotation period, the fractional value altered during the phase rotation period to effectuate a frequency deviation between the second carrier frequency and the first carrier frequency.

19. The method of claim 18, further comprising:
   increasing the fractional value during the phase rotation period based on a target phase shift value;
   increasing, by a detector circuit in the second LO circuit, a controlled voltage based on the increased fractional value; and
   increasing, by the VCO, the VCO frequency based on the increased controlled voltage.

20. The method of claim 13, further comprising:
   coupling, by a switching circuit, the second LO circuit to the second mixer before a compensation period is over; and
   coupling, by the switching circuit, the first LO circuit to the second mixer after the compensation period is over, wherein the compensation period extends beyond the phase rotation period.

* * * * *